US009069097B2

(12) United States Patent
Zhang et al.

(10) Patent No.: US 9,069,097 B2
(45) Date of Patent: Jun. 30, 2015

(54) SURFACE TO BOREHOLE ELECTROMAGNETIC SURVEYING USING METALLIC WELL CASINGS AS ELECTRODES

(75) Inventors: Hong Zhang, NE Kenmore, WA (US); Richard A. Rosthal, Richmond, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1034 days.

(21) Appl. No.: 13/131,219

(22) PCT Filed: Oct. 22, 2009

(86) PCT No.: PCT/US2009/061588
§ 371 (c)(1),
(2), (4) Date: Sep. 9, 2011

(87) PCT Pub. No.: WO2010/065208
PCT Pub. Date: Jun. 10, 2010

(65) Prior Publication Data
US 2011/0308789 A1  Dec. 22, 2011

Related U.S. Application Data

(60) Provisional application No. 61/119,279, filed on Dec. 2, 2008.

(51) Int. Cl.
*E21B 43/00* (2006.01)
*G01V 3/28* (2006.01)
*E21B 47/12* (2012.01)

(52) U.S. Cl.
CPC *G01V 3/28* (2013.01); *E21B 47/122* (2013.01)

(58) Field of Classification Search
USPC .......................................................... 324/355
See application file for complete search history.

(56) References Cited

U.S. PATENT DOCUMENTS

| 3,007,107 | A |   | 10/1961 | Gondouin |
|-----------|---|---|---------|----------|
| 4,796,186 | A |   | 1/1989  | Kaufman  |
| 4,875,015 | A | * | 10/1989 | Ward ............................ 324/323 |
| 5,187,440 | A |   | 2/1993  | Vail     |
| 5,442,294 | A |   | 8/1995  | Rorden   |
| 5,654,639 | A |   | 8/1997  | Locatelli et al. |
| 5,914,603 | A |   | 6/1999  | Daily et al. |

(Continued)

OTHER PUBLICATIONS

Alumbaugh, D. L. et al, "Theoretical and Practical Considerations for Crosswell Electromagnetic Tomography Assuming a Cylindrical Geometry", Geophysics, vol. 60, No. 3, 1995, pp. 846-870.

(Continued)

*Primary Examiner* — Jennifer H Gay
*Assistant Examiner* — Caroline Butcher
(74) *Attorney, Agent, or Firm* — Cathy Hewitt; Michael Dae

(57) ABSTRACT

Methods and related systems are described for making measurements of an electromagnetic field in a subterranean formation that has been induced by a current loop. The current loop uses one or more steel wellbore casings as electrodes. Receiver arrays are positioned either at surface/seafloor, in the same, or in nearby wells. In the most general case, the receivers are tri-axial. A section of metallic casing in one well can be used as a current source and the electromagnetic field at surface can be measured using an array of EM receivers placed at a range of distances from the wellbore.

37 Claims, 7 Drawing Sheets

(56) References Cited

U.S. PATENT DOCUMENTS

| | | | |
|---|---|---|---|
| 6,088,655 | A | 7/2000 | Daily et al. |
| 6,219,619 | B1 | 4/2001 | Xiao et al. |
| 6,541,975 | B2 | 4/2003 | Strack |
| 6,603,313 | B1 * | 8/2003 | Srnka .................... 324/354 |
| 7,202,671 | B2 | 4/2007 | Strack et al. |
| 7,303,617 | B1 | 12/2007 | Taga et al. |
| 7,443,168 | B2 | 10/2008 | Gold et al. |
| 7,495,446 | B2 | 2/2009 | Lovell et al. |
| 7,795,872 | B2 | 9/2010 | Clark et al. |
| 7,991,553 | B2 * | 8/2011 | Alumbaugh et al. ........... 702/6 |
| 8,310,239 | B2 | 11/2012 | Zhang et al. |
| 8,326,539 | B2 | 12/2012 | Morrison et al. |
| 2003/0038634 | A1 | 2/2003 | Strack |
| 2005/0242819 | A1 | 11/2005 | Gold et al. |
| 2006/0028208 | A1 * | 2/2006 | Strack et al. ............. 324/355 |
| 2007/0052551 | A1 | 3/2007 | Lovell et al. |
| 2009/0281731 | A1 | 11/2009 | Morrison et al. |
| 2010/0259267 | A1 | 10/2010 | Rosthal et al. |

OTHER PUBLICATIONS

DePavia, L. et al, Next Generation Cross-Well EM Imaging Tool, SPE 116344, presented at the SPE Annual Technical Conference and Exhibition held in Denver, CO, Sep. 21-24, 2008, pp. 1-11.

Newmark, R. L., "Electrical Resistance Tomography Using Steel Cased Boreholes as Electrodes", SEG 1999 Expanded Abstracts, 4 pages.

Spies, B. R. et al, Sensitivity Analysis of Crosswell Electromagnetics, Geophysics, vol. 60, No. 3, pp. 834-845.

Vasic, D. et al, "On Feasibility of Inductive Conductivity Measurements of Formation Surrounding a Metal Casing", IEEE International Instrumentation and Measurement Technology Conference, May 12-15, 2008, Vancouver, Canada, 4 pages.

Wilt, M. J. et al, "Crosswell Electromagnetic Tomography: System Design Considerations and Field Results", Geophysics, vol. 60, No. 3, 1995, pp. 871-885.

\* cited by examiner

SURFACE TO BOREHOLE ELECTROMAGNETIC SURVEYING USING METALLIC WELL CASINGS AS ELECTRODES

CROSS REFERENCE TO RELATED APPLICATION

This patent application claims benefit of U.S. Provisional Patent Application Ser. No. 61/119,279, filed Dec. 2, 2008, which is incorporated by reference herein.

BACKGROUND

1. Field

This patent specification relates to electromagnetic measurements made in connection with boreholes. More particularly, this patent specification relates to methods and systems for making surface to borehole, borehole-to-surface and/or crosswell electromagnetic induction logging using metallic well casings as electrodes.

2. Background

Cross-well electromagnetic surveys have been used in the past to map formations in-between to wells in oil-field environment, and it is proven that it may provide useful information to the clients. There are many papers in this area, among the earliest ones are modeling studies in 1995 by B. R. Spies and T. M. Habashy, Sensitivity analysis of crosswell electromagnetics, Geophysics, Vol. 60, No. 3, P. 834-845, by David L. Alumbaugh and H. Frank Morrison, Theoretical and practical considerations for crosswell electromagnetic tomography assuming a cylindrical geometry, Geophysics, Vol. 60, No. 3, 1995, P. 846-870, and experimental studies by M. J. Wilt, D. L. Alumbaugh, H. F. Morrison, A. Becker, K. H. Lee and M. Deszcz-Pan, Crosswell electromagnetic tomography: system design considerations and field results, Geophysics, Vol. 60, No. 3, 1995, P. 871-885. A recent one is regarding a new generation crosswell EM system, see, L. DePavia, P. Zhang, D. L. Alumbaugh, C. Levesque, H. Zhang, and R. A. Rosthal, Next generation cross-well EM imaging tool, SPE, 2008.

There has been previous work on Electrical Resistance Tomography (ERT). See: W. D. Daily, A. L. Ramirez, Electrical resistance tomography using steel cased borholes as electrodes, U.S. Pat. No. 5,914,603, Jun. 22, 1999, W. D. Daily, C. Schenkel, and A. L. Ramirez, Electrical resistance tomography from measurements inside a steel cased borehole, U.S. Pat. No. 6,088,655, Jul. 11, 2000, and R. L. Newmark, Electrical Resistance Tomography using steel cased boreholes as electrodes, SEG 1999 expanded abstract. An array of steel cased boreholes are used as electrodes for current injection and electrical potential measurements to map subsurface the electrical resistivity distribution, and the electrical potential measurements can either be on surface, or inside a steel cased borehole.

U.S. Pat. No. 5,187,440 discusses measuring resistivity changes from within a first cased well to monitor fluids injected into oil bearing geological formations from a second cased well while passing electrical current between the two cased wells. However, the patent only discusses using cross well arrangement by injecting the current from fixed locations in each of two cased wells.

SUMMARY

According to some embodiments, a downhole tool system for making electromagnetic measurements of a subterranean formation is provided. The system includes a first downhole tool deployable in a metallic cased wellbore and adapted to make electrical contact with a wall of the metallic casing so as to establish a current loop in the formation that partially includes the metallic casing wall; and one or more receivers deployable and adapted so as to inductively or galvanically detect a field propagated through the formation that has been induced by the established current loop. The receivers are preferably induction coil and/or electrode receivers. The first downhole tool can include first and second units that each electrically contact the metallic casing wall at different locations. The distance between the contact locations can preferably be altered while the tool is deployed downhole. The system can also include a second downhole tool deployable in a second metallic cased wellbore. The receivers can be positioned on the surface and/or in a separate wellbore.

According to some embodiments, a method for making electromagnetic measurements of a subterranean formation is also provided. The method includes deploying a first tool in a metallic cased wellbore; electrically contacting a wall of the casing of wellbore; establishing a current loop in the formation that partially includes a portion of the metallic casing wall of the wellbore, wherein the current loop induces a field in the subterranean formation; and inductively or galvanically detecting the field using one or more receivers.

Further features and advantages will become more readily apparent from the following detailed description when taken in conjunction with the accompanying drawings.

BRIEF DESCRIPTION OF THE DRAWINGS

The present disclosure is further described in the detailed description which follows, in reference to the noted plurality of drawings by way of non-limiting examples of exemplary embodiments, in which like reference numerals represent similar parts throughout the several views of the drawings, and wherein.

DETAILED DESCRIPTION OF THE PREFERRED EMBODIMENTS

Figure 1A:
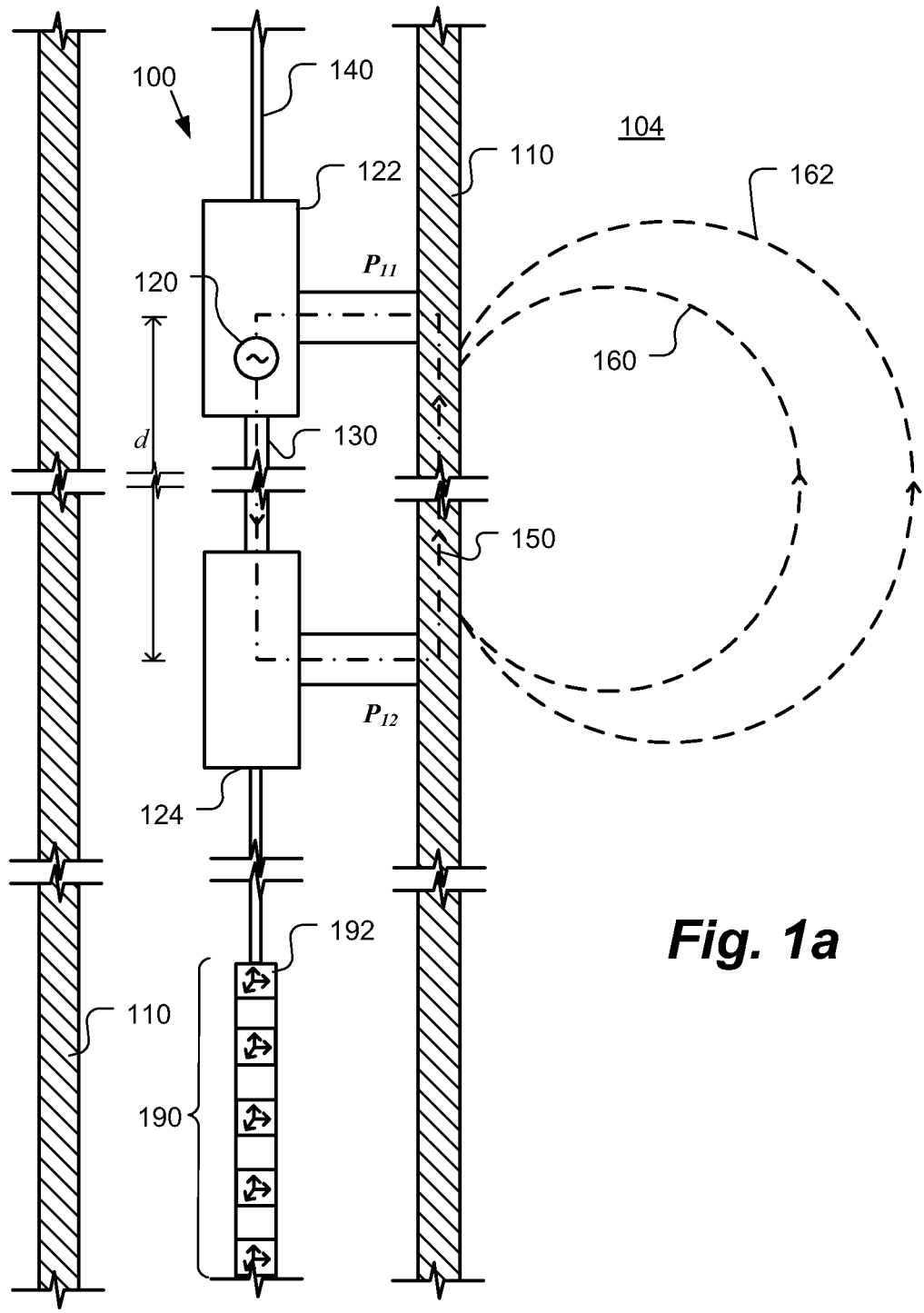
FIGS. 1a and 1b show a current source positioned in a metallic cased well and receivers placed in the same well or in a nearby horizontal well, according to some embodiments.

In the following detailed description of the preferred embodiments, reference is made to accompanying drawings, which form a part hereof, and within which are shown by way of illustration specific embodiments by which the disclosure may be practiced. It is to be understood that other embodiments may be utilized and structural changes may be made without departing from the scope of the disclosure.

The described techniques are related to surface-to-borehole, borehole-to-surface and/or cross well electromagnetic logging in metallic cased wells. Means are described for using metallic casings in one or two wells as electrodes to provide electromagnetic sources. This can be accomplished by at least two configurations/combinations of sources in metallic cased borehole, and the receivers can be placed in nearby wells, or at surface or sea floor for shallow and near surface applications. By properly designing the electrodes and properly placing of electrodes relative to electromagnetic receivers, it is possible to extract useful geological information of the ground from a survey.

According to embodiments, steel wellbore casings are used as electrodes in one or two wells. Receiver arrays are positioned either at surface or in nearby wells. The receivers can be tri-axial receivers (induction coil and/or electrodes). There are several configurations described. According to some embodiments a section of metallic casing in one well is used as a current source and the electromagnetic field at surface or sea floor using an array of tri-axial receivers placed at a range of distances from the wellbore. For example, the receiver array is placed from zero to up to 1 km away from and around the wellbore. According to other embodiments, a string of tri-axial induction coil receivers is positioned inside a horizontal section of a nearby wellbore. According to yet other embodiments, two sections of steel casings in two nearby wells are used to form a current loop together with the formation in-between the two wells. Arrays of 3-component induction receivers are placed into nearby wells or receiver arrays placed at surface in-between the two wells to measure the magnetic fields induce by the current loop. Depending upon the nature of the receivers, the current can be AC or DC. It is also possible to measure electric fields at the surface or seafloor or in nearby open holes.

Four observations have been made with respect to previous measurement techniques made through crosswell EM surveys where magnetic dipole sources are positioned inside one well while receiver strings are positioned in another steel cased well, as well as in surface-to-borehole surveys where either line current sources and/or surface current loop sources are placed on the surface while receiver strings are placed at varies depths into steel cased wells. The four observations are described as follows: (1) receiver sensitivity is strongly affected by steel casing due to its magnetic permeability and electrical conductivity; (2) magnetic permeability of the casing is non-linear and will be modified by the magnetic field due to current flowing in casing; (3) in cross-well and surface-to-borehole electromagnetic surveys, receiver anomalies have been observed in some conditions when magnetic field receiver tool strings are located inside steel well casing, especially when the receiver coil was near a casing collar or other casing inhomogeniouties, and/or when the source is close to receiver well; and (4) in cross-well surveys, the magnetic moment of the transmitter inside steel casing is greatly reduced by both the conductive and magnetic nature of the steel casing, and the eddy current loss is more significant at higher frequencies. Embodiments described herein avoid the above-mentioned complexities in dealing with steel casing influences on electromagnetic transmitters.

Figure 1B:
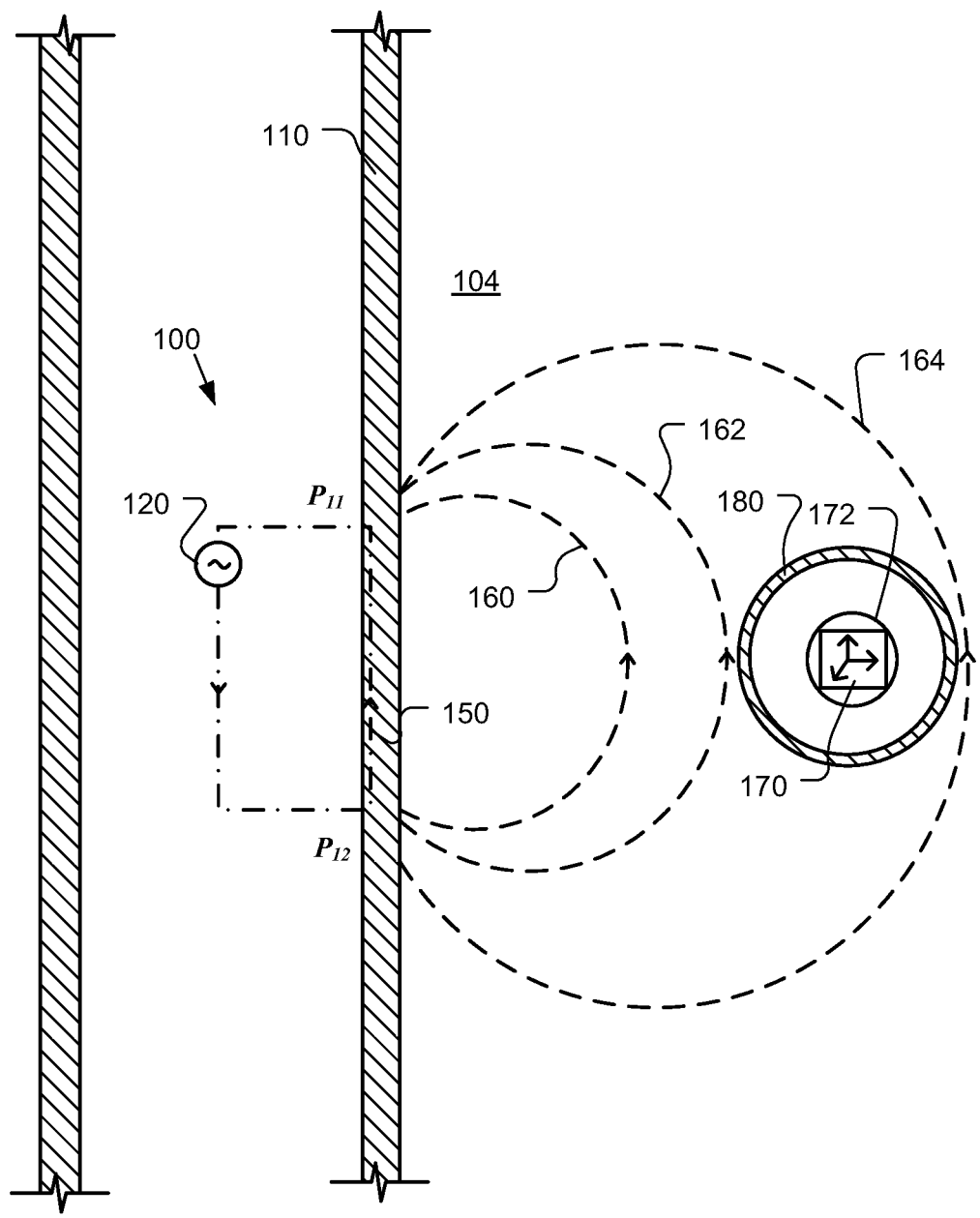

FIGS. 1a and 1b show a current source positioned in a metallic cased well, according to some embodiments. In FIG. 1a, current source tool 100 is placed within metallic wellbore casing 110 of a wellbore in a rock formation 104. The casing 110, for example, is commonly made of steel. Current source 120 is located within upper shuttle 122. A lower shuttle 124 is located some distance below the upper shuttle 122. Current injection and return points $P_{11}$ and $P_{12}$ are established by contacting the inner wall of casing 110 at the two locations by upper and lower shuttles 122 and 124 as shown. An extendable wired link 130 electrically connects the upper and lower shuttles 122 and 124. The tool 100 is deployed using a wireline cable 140 such that the tool 100 can be placed to various depths within the well. A receiver array can be positioned at the surface or in a nearby wellbore, and is used to measure EM field during a survey. The upper and lower shuttles are separately positionable such that the separation distance d between points $P_{11}$ and $P_{12}$ can be changed during logging. The current loops 150, 160 and 162 are thus created by the two shuttles 124 and 122, the extendable link 130 and a portion of the casing 110. Note that current loop 150 passes within the wall of casing 110 while current loops 160 and 162 pass through the formation 104. The current loops 150, 160 and 162 also induce a magnetic field having flux lines perpendicular to the plane of FIG. 1a.

According to some embodiments, a receiver tool string can be provided above shuttle 122 or below shuttle 124 such that the receiver tool can measure the fields generated by the currents. Shown in FIG. 1a is a receiver string 190 below shuttle 124. Receiver string 190 includes a plurality of receiver units 192, which are preferably tri-axial induction-coil based. Receiver string 190 is also preferably independently moveable from the shuttles 122 and 124, such that for any fixed position of the shuttles 122 and 124, the receiver string 190 can be moved to various locations to obtain a depth log.

FIG. 1b shows a current source tool positioned in metallic cased well, according to some embodiments. As in FIG. 1a, a tool 100 (structural details not shown) is positioned in a wellbore in formation 104 having a metallic casing 110. Tool 100 has a current source 120 that establishes current loops 150, 160, 162 and 164 though the tool 100, injection points $P_{11}$ and $P_{12}$ and a portion of casing 110. By positioning the tool 100 at different depths and/or altering the distance between the upper and lower shuttles (not shown) of tool 100 the current injection points $P_{11}$ and $P_{12}$ are placed at various depths. A tri-axial induction coil type receiver 170 is deployed in tool 172 positioned in a nearby well 180 to measure EM field during a survey. Although the well 180 is shown as a horizontal section in FIG. 1b, according to other embodiments, the tool 172 is deployed in a vertical or other orientation of a nearby well.

Figure 2:
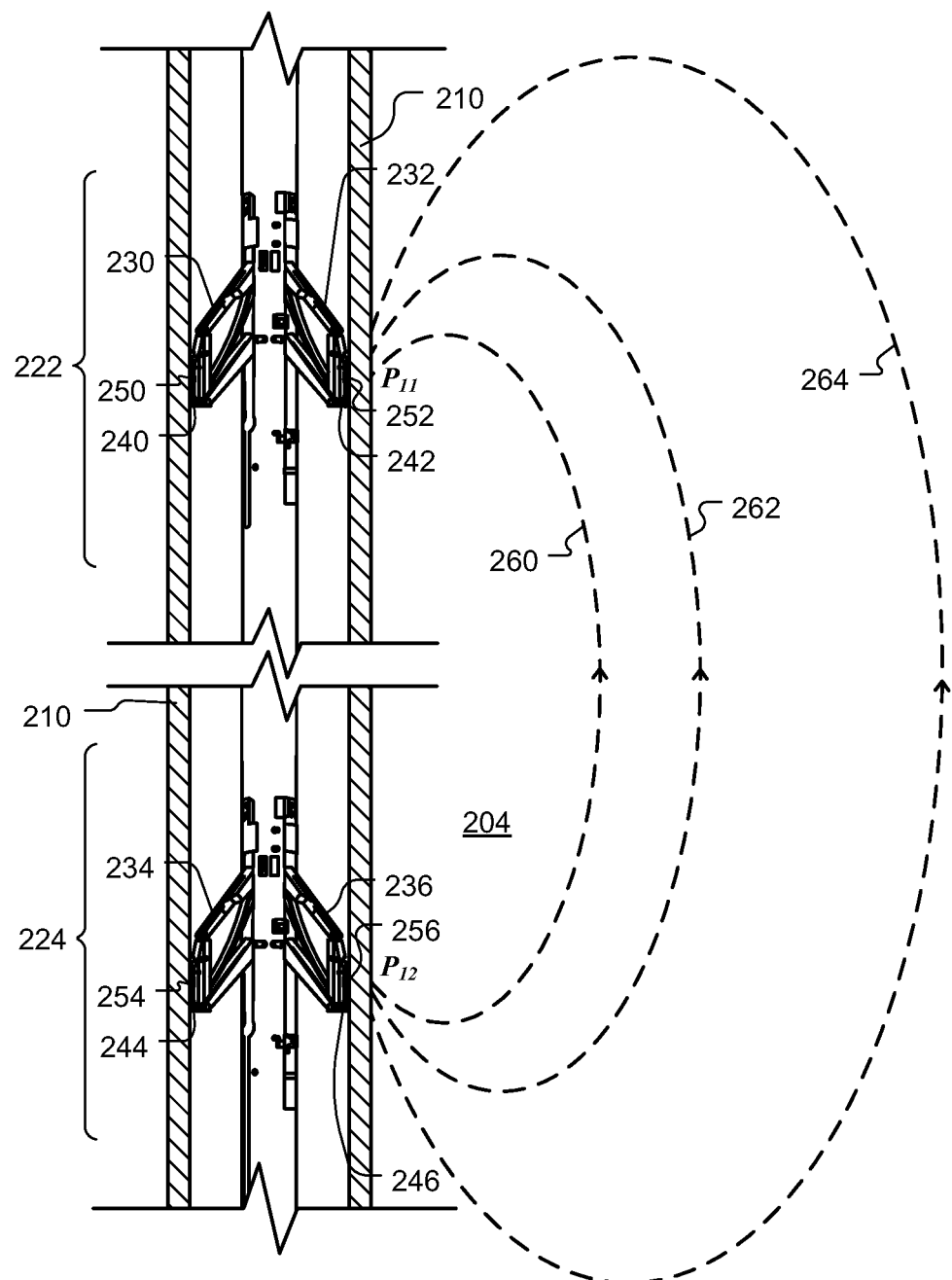
FIG. 2 shows a tool with electrodes deployed in a wellbore for current injections into metallic casing according to some embodiments.

According to some embodiments, specially designed electrodes can be deployed into metallic cased wells. Contact is made to the inside wall of the well casing. The techniques used to make this contact may be similar to those used in Schlumberger's Cased Hole Formation Resistivity tools line (CHFR), such as the Schlumberger's CHFR-Plus and CHFR-Slim tools. FIG. 2 shows a tool with electrodes deployed in a wellbore according to some embodiments. The tool includes an upper shuttle 222 and a lower shuttle 224. The shuttles are of a type similar to those used with the CHFR. The upper shuttle 222 includes three electrode arms of which two are shown, namely arms 230 and 232. Likewise, lower shuttle 224 includes three electrode arms of which two are shown, namely arms 234 and 236. Mounted on the end of each of the arms is an electrode pad, such as pads 240, 242, 244 and 246 which can be urged toward the casing wall 210 using the arms. Mounted on each pad is an electrode, such as electrode 250, 252, 254 and 256. As with the CHFR tool, measurement is performed while the shuttles are stationary to avoid noise introduced by tool movement. Contact between the electrodes and the casing is improved by design of the electrodes, which penetrate through small amounts of casing scale and corrosion. Electrical current is injected into the steel casing through these electrical contact points such as points $P_{11}$ and $P_{12}$ to form a current source along the steel casing 210. The current loops induced in the formation 204 are 260, 262 and 264. During a survey, the depths of the injection points and the receiver array location (not shown) are varied to obtain a full data set within the zone of interest for inversion.

Figure 3:
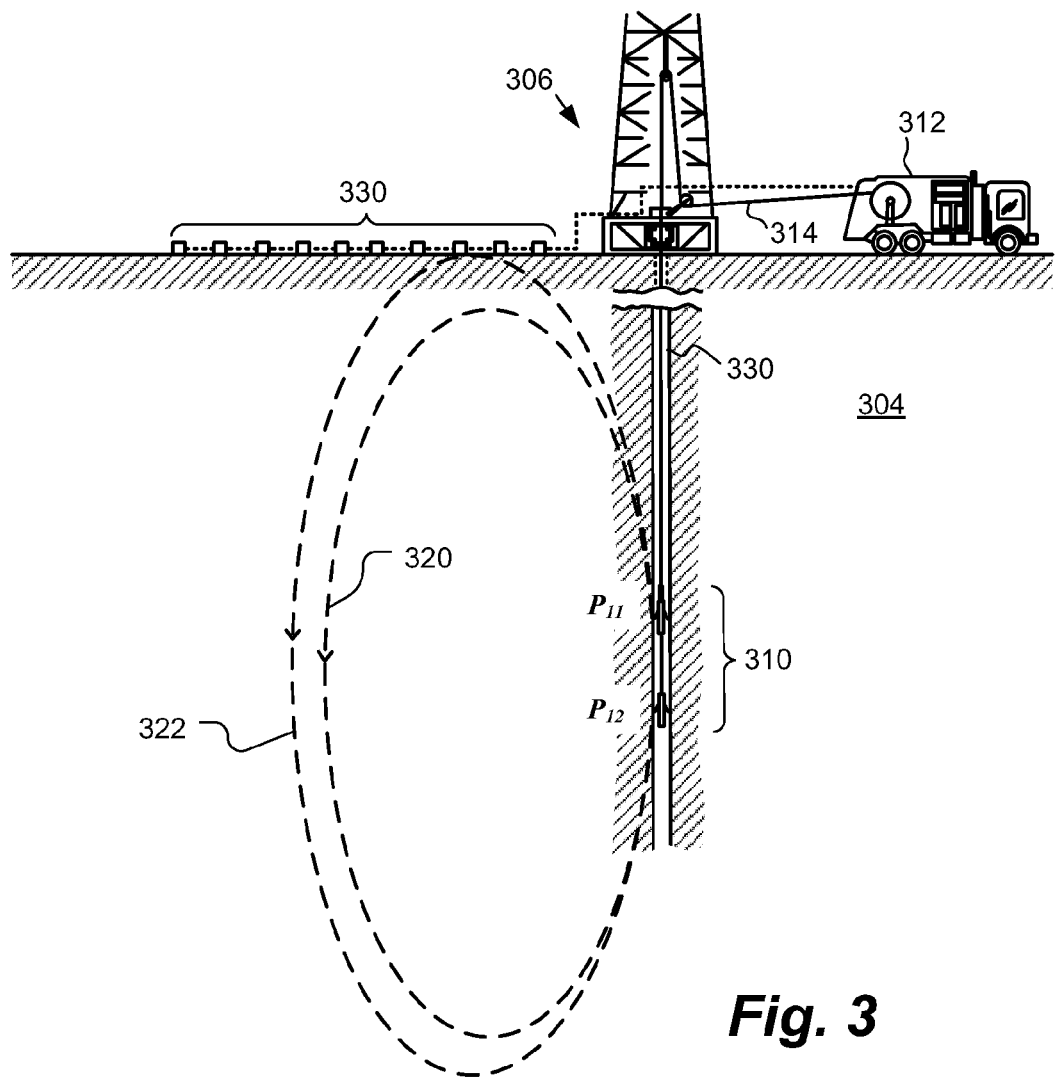
FIG. 3 shows a downhole tool deployed in a wellbore and receivers deployed on the surface, according to some embodiments.

FIG. 3 shows a downhole tool deployed in a wellbore and receivers deployed on the surface, according to some embodiments. Tool 310 is positioned in wellbore 330 having wellhead 306. Tool 310 includes upper and lower shuttles and generates a current loop as described elsewhere herein. The current loops 320 and 322 are shown in formation 304. Tool 310 is suspended from a wireline cable 314 which is deployed from logging truck 312. A receiver array 330 is placed at the surface or sea floor. If this is a sea floor situation, then the truck will be replaced by an offshore unit on the drilling rig or platform. Positioning the array 330 on the surface is particularly suitable for shallow applications and/or resolving near surface structures. Each of the receiver units contains a tri-axial induction type receiver device. Alternatively, they could contain electrodes for sensing the electric field directly. The digitized signals from the receivers are transmitted to and recorded by equipment in the logging truck 312. According to some embodiments, in addition to the surface array 330, a tri-axial induction coil receiver string or an electrode array can be put into a nearby well (not shown) such as indicated in FIG. 1b. Note that if tri-axial receiver string is not available, a single component receiver strings can be used in wells that are oriented with a non-zero component in the direction orthogonal to the transmitter well.

Since the current injected into casing will leak into the formation gradually along the length between and even outside of the two injection points, the amount of current in casing at various depths between the two current injection points $P_{11}$ and $P_{12}$ an be measured by a casing current sensor as described in co-pending provisional patent application Ser. No. 61/119,275 entitled Induction Coil Sensitivity Change Due To Axial Current Induced In Steel Casing, filed on Dec. 2, 2008, which is incorporated herein by reference. According to some embodiments, the current in the casing can be measured using the method as is known in connection with Schlumberger's CHFR tool.

In addition, the distance between the two injection points $P_{11}$ and $P_{12}$ can be varied through a device which allows logging of sub-sections of casing downhole using the bottom shuttle relative to the top shuttle in a downhole tool string.

According to some embodiments, an existing E-pulse tool made by Schlumberger is used as a current source in the cased wellbore. See, U.S. Provisional Patent Application No. 61/168,281 entitled Borehole to Surface Resistivity Logging, filed on Apr. 10, 2009. The E-Pulse tool is designed to provide an alternative to mud-pulse telemetry. A voltage is applied to an insulating gap downhole to create an E-dipole source and the voltage is measured between the wellhead and a distant electrode. According to some embodiments the voltage on an array of electrodes on the surface is measured to obtain information about the currents in the earth.

Figure 4:
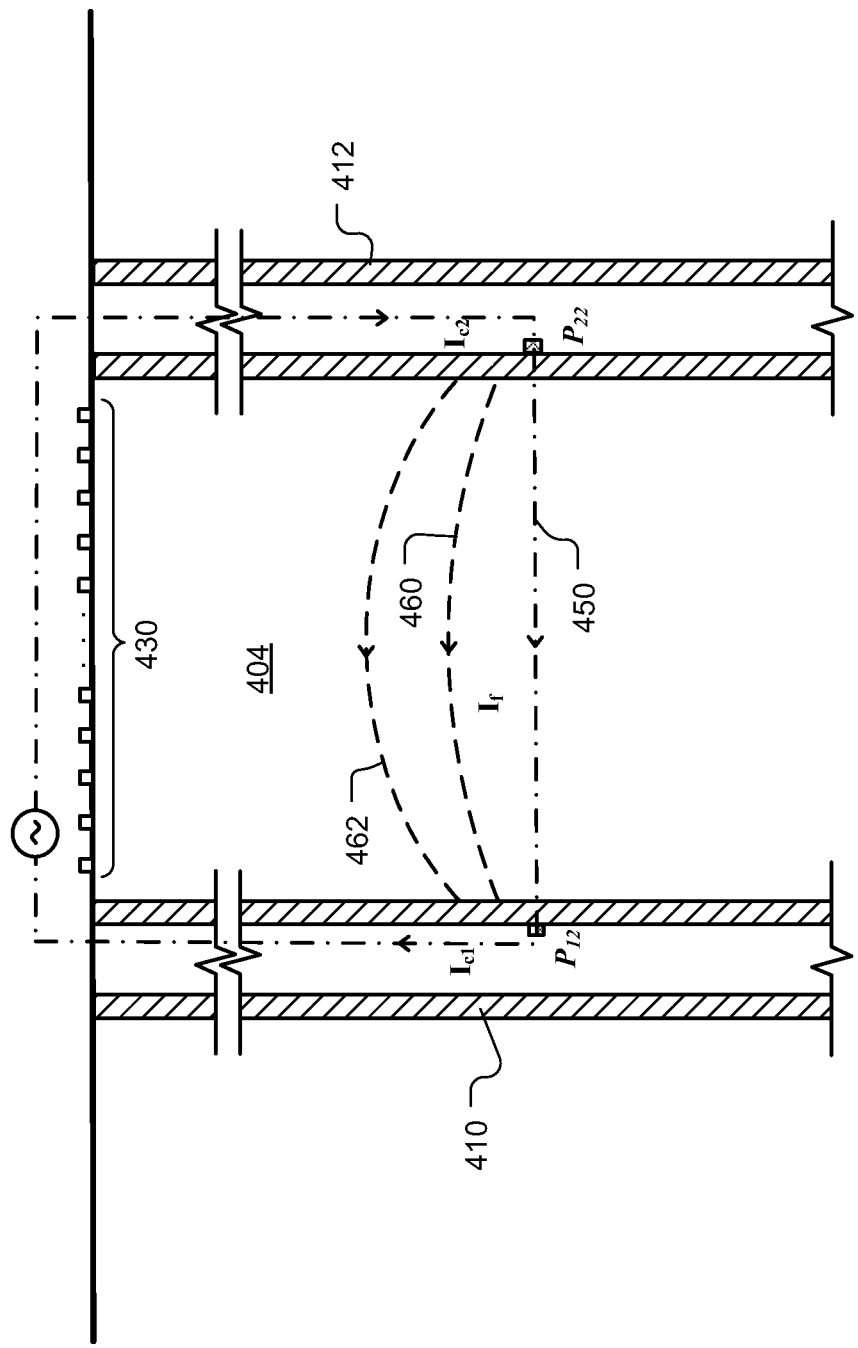
FIG. 4 shows an arrangement of creating current loops in formations between two wells, according to some embodiments.

FIG. 4 shows an arrangement of creating current loops in formation between two wells, according to some embodiments. Electrical contact points similar to those described with respect to FIGS. 1-2 are placed inside two metallic cased wells separated by a distance. For example, a single shuttle such as shuttle 222 in FIG. 2, is positioned in each of the two metallic cased wells 410 and 412. Current is injected at points $P_{12}$ and $P_{22}$ to establish current loops 450, 460 and 462 that includes sections casing wells 410 and 412, and formation 404 that is in-between the two wells 410 and 412. An array of electromagnetic receivers 430 can be placed at surface or on sea floor. The relative depth of the current injection points in the two wells, as well as the receiver array locations can be varied during a survey. Receiver array 430 at surface measures the EM field generated by the current loops 450, 460 and 462 through formation 404. Current injection points $P_{12}$ and $P_{22}$ can be moved to various depths during a survey to cover the zone of interest.

Similar to the embodiments described with respect to FIGS. 1-3, the current injected into casings will leak into the formation gradually along the length of the two casing sections in the current loop. According to some embodiments, the amount of current in the casing can also be measured with a casing current sensor as described in co-pending provisional patent application Ser. No. 61/119,275, filed on Dec. 2, 2008. The locations of current injection and return points in the two wells need not be at the same depth. For instance, a survey can be conducted by independently varying the position of $P_{12}$ and $P_{22}$ in the same way that a crosswell EM survey is now performed.

Figure 5:
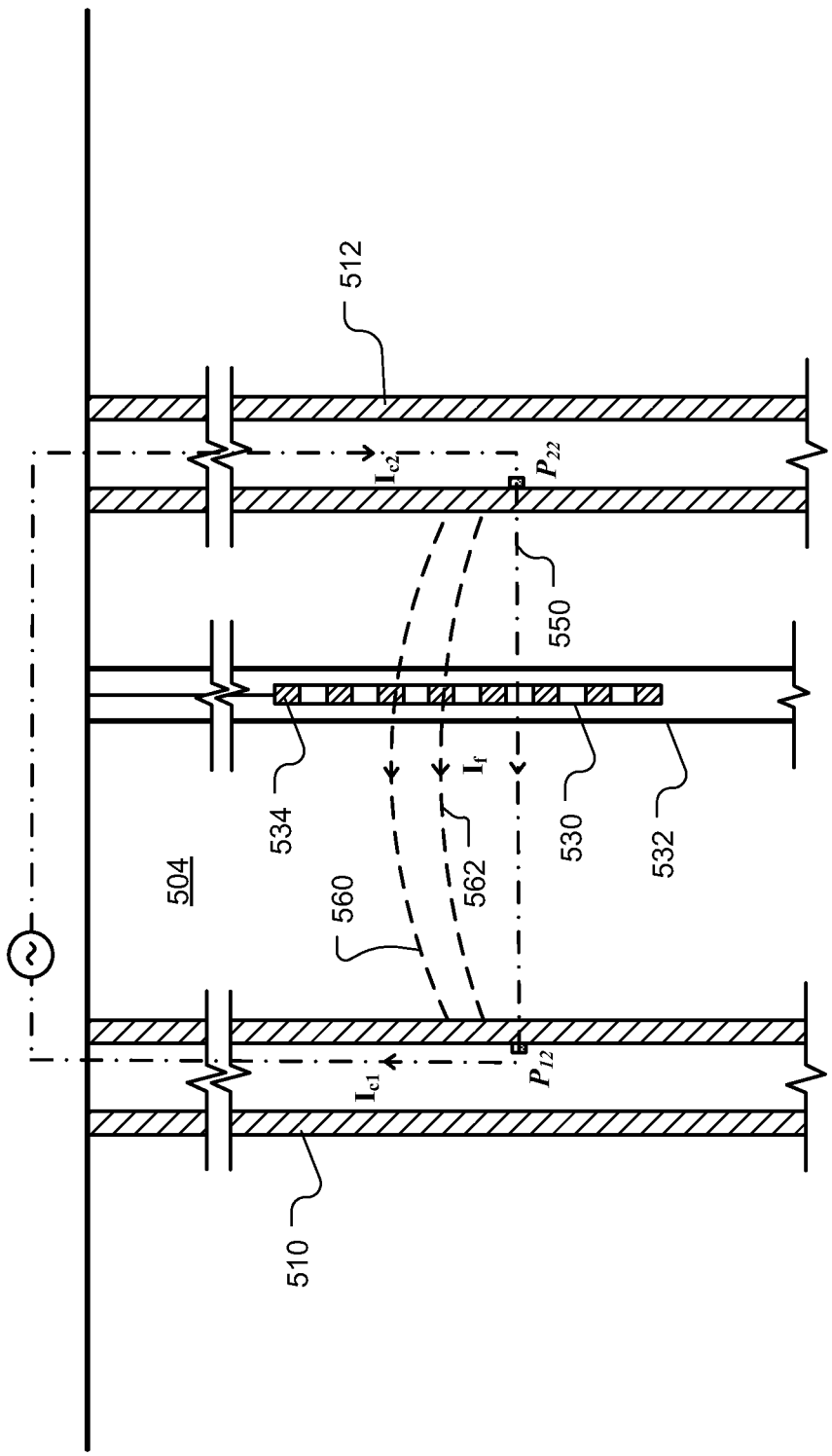
FIG. 5 shows an inter-well current loop created by current injection into two metallic well casings and a receiver string located in a third well, according to some embodiments.

FIG. 5 shows an inter-well current loop created by current injection into two metallic well casings and a receiver string located in a third well, according to some embodiments. Electrical contact points similar to those described with respect to FIGS. 1-2 are placed inside two metallic cased wells separated by a distance. For example, a single shuttle such as shuttle 222 in FIG. 2, is positioned in each of the two metallic cased wells 510 and 512. Current is injected at points $P_{12}$ and $P_{22}$ to establish current loops 550, 560 and 562 that includes sections casing wells 510 and 512, and formation 504 that is in-between the two wells 510 and 512. The relative depth of the current injection points in the two wells, as well as the receiver array locations can be varied during a survey. For example, current injection points $P_{12}$ and $P_{22}$ can be moved to various depths during a survey by varying the depths of the shuttles used to inject the current, in order to cover the zone of interest. A tri-axial receiver string 530 is positioned inside a nearby well 532. The receiver string 530 includes a number of tri-axial induction-coil-based EM receivers such as receiver 534 to measure the EM field generated by the current loops 550, 560 and 562 through formation 504. Current injection points $P_{12}$ and $P_{22}$ can be moved to various depths during a survey to cover the zone of interest.

Similar to the embodiments described with respect to FIGS. 1-4, the current injected into casings will leak into the formation gradually along the length of the two casing sections in the current loop. According to some embodiments, the amount of current in the casing can also be measured with a casing current sensor as described in co-pending provisional patent application Ser. No. 61/119,275. The locations of current injection and return points in the two wells need not be at the same depth. For instance, a survey can be conducted by independently varying the position of $P_{12}$ and $P_{22}$ in the same way that a crosswell inductive survey is now performed.

Figure 6:
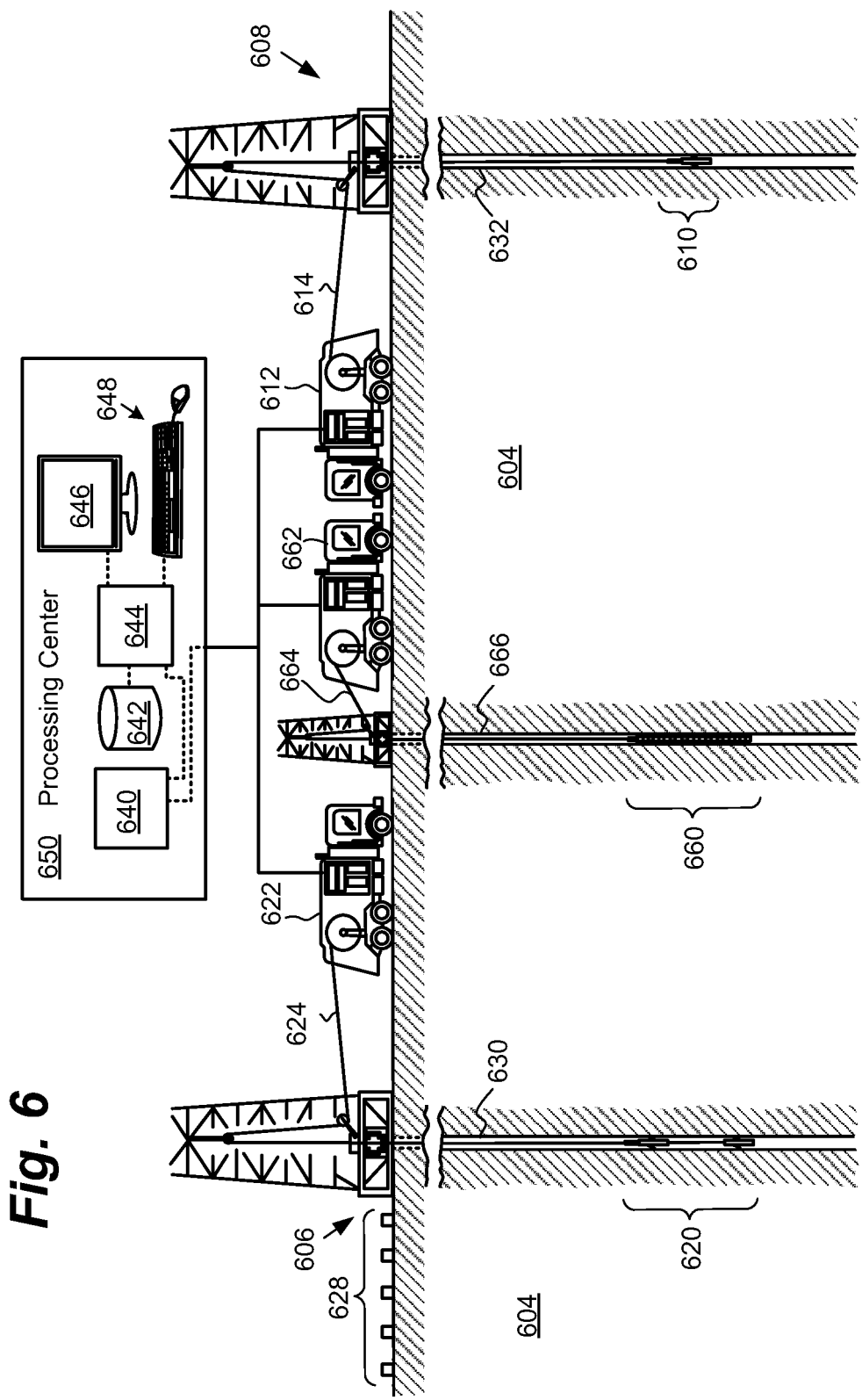
FIG. 6 illustrates a system for making and processing EM surveys using one or more metallic casings as electrodes, according to some embodiments.

FIG. 6 illustrates a system for making and processing EM surveys using one or more metallic casings as electrodes, according to some embodiments. A current injection tool 620 is deployed in a metallic cased well 630 via wireline 624 and logging truck 622 at wellsite 606. Tool 620 includes one or two shuttles for injecting current into the casing of well 630 such as shown and described with respect to FIGS. 1-5.

According to some embodiments, an array of receivers 628 is deployed on the surface or sea floor to measure the EM field induced in formation 604. The receivers can be tri-axial receivers such as shown and described with respect to FIGS. 3-4 or they could be electrode receivers. Measurements from receivers 628 are recorded and can be processed in one of the logging trucks or can be transmitted directly to a processing center 650. Processing center 650 includes one or more central processing units 644, storage system 642, communications and input/output modules 640, a user display 646 and a user input system 648.

According to some embodiments, an array of receivers 660 is deployed in a wellbore 666 via a wireline 664 from wireline truck 662. The receivers can be tri-axial receivers such as shown and described with respect to FIGS. 1*b* and 5. Measurements from receivers 660 are recorded and can be processed in logging truck 662 or can be transmitted to processing center 650.

According to some embodiments at wellsite 608, current injection tool 610 is deployed in cased well 632 via wireline 614 and logging truck 612. Tool 610 includes one or two shuttles for injecting current into the casing of well 632 such as shown and described with respect to FIGS. 1-5. According to some other embodiments, the same logging truck is used to gather measurement from surface array 628 and/or downhole array 660, as well as to deploy a current injection tool such as tool 620. According to some other embodiments, the processing center 650 can be contained in one or more of the logging trucks 612, 622, and 662.

Whereas many alterations and modifications of the present disclosure will no doubt become apparent to a person of ordinary skill in the art after having read the foregoing description, it is to be understood that the particular embodiments shown and described by way of illustration are in no way intended to be considered limiting. Further, the disclosure has been described with reference to particular preferred embodiments, but variations within the spirit and scope of the disclosure will occur to those skilled in the art. It is noted that the foregoing examples have been provided merely for the purpose of explanation and are in no way to be construed as limiting of the present disclosure. While the present disclosure has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present disclosure in its aspects. Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A downhole tool system for making electromagnetic measurements of a subterranean formation comprising:
   a first downhole tool deployable in a metallic cased wellbore and adapted to make electrical contact with a wall of the metallic casing so as to establish a current loop that partially includes the metallic casing wall; and
   one or more receivers deployable and adapted so as to inductively detect a field in the formation that has been produced by the established current loop;
   wherein the first downhole tool comprises a first unit deployable and adapted to make electrical contact with the metallic casing wall at a first location and a second unit deployable and adapted to make electrical contact with the metallic casing wall at a second location, wherein the established current loop includes at least a portion of the casing wall between the first and second location; and
   wherein the first and second units are configured to be repositionable in relation to one another while the tool is deployed downhole to alter the distance between the first and second locations while the tool is deployed downhole.

2. A system according to claim 1 wherein the one or more receivers are induction coil receivers.

3. A system according to claim 1 wherein the first unit comprises a first shuttle and the second unit comprises a second shuttle, wherein the first shuttle and the second shuttle are connected to one another via an extendable wired link.

4. A system according to claim 3 wherein the extendable wired link is configured to carry electrical power.

5. A system according to claim 1 wherein the one or more receivers are adapted to be deployed on the surface or on a sea floor.

6. A system according to claim 5 wherein the one or more receivers includes one or more multi-component receivers.

7. A system according to claim 6 wherein the one or more receivers includes one or more tri-axial receivers.

8. A system according to claim 1 wherein the one or more receivers are adapted to be deployed in a wellbore separate from the wellbore in which the first tool is deployed.

9. A system according to claim 8 wherein the one or more receivers includes one or more multi-component receivers.

10. A system according to claim 9 wherein the one or more receivers includes one or more tri-axial receivers.

11. A system according to claim 1 wherein one or more receivers are adapted to be deployed as part of the first downhole tool in the metallic cased wellbore.

12. A system according to claim 11 wherein the first downhole tool is adapted to adjust the distance between the one or more receivers and the first unit or the second unit, or both, such that measurements using the one or more receivers can be made at a plurality of locations for each location of electrical contact.

13. A system according to claim 1 further comprising a processing system programmed and adapted to estimate formation parameters using data from the one or more receivers.

14. A method for making electromagnetic measurements of a subterranean formation comprising:
   deploying a first tool in a first metallic cased wellbore;
   electrically contacting a wall of the casing of first wellbore using the first tool;
   establishing a current loop that partially includes a portion of the metallic casing wall of the first wellbore, wherein the current loop induces a field in the subterranean formation;
   deploying a second downhole tool in a second metallic cased wellbore;
   electrically contacting a wall of the casing of the second wellbore, wherein the established current loop includes the first tool, part of the metallic casing of the first wellbore, part of the subterranean formation, part of the metallic casing of the second wellbore, and the second tool; and
   inductively detecting the field using one or more receivers.

15. A method according to claim 14 wherein the one or more receivers are induction coil receivers.

16. A method according to claim 14 further comprising varying the depths at which the first and second casing walls are electrically contacted.

17. A method according to claim 14 further comprising deploying the one or more receivers on the surface or sea floor.

18. A method according to claim 17 wherein the one or more receivers includes one or more multi-component receivers.

19. A method according to claim 18 wherein the one or more receivers includes one or more tri-axial receivers.

20. A method according to claim 14 further comprising deploying the one or more receivers in a third wellbore.

21. A method according to claim 20 wherein the one or more receivers includes one or more multi-component receivers.

22. A method according to claim 21 wherein the one or more receivers includes one or more tri-axial receivers.

23. A method according to claim 14 wherein one or more receivers are deployed in the first metallic cased wellbore.

24. A method according to claim 23 further comprising:
adjusting the distance between the one or more receivers and the electrical contact position; and
repeating the inductive detection.

25. A method according to claim 14 further comprising estimating formation parameters based at least in part on data from the one or more receivers.

26. A downhole tool system for making electromagnetic measurements of a subterranean formation comprising:
a first downhole tool deployable in a metallic cased wellbore and adapted to make electrical contact with a wall of the metallic casing so as to establish a current loop that partially includes the metallic casing wall; and
one or more surface receivers deployable on an earth surface or sea floor and adapted so as to detect a field in the formation that has been produced by the established current loop;
wherein the first downhole tool comprises a first unit deployable and adapted to make electrical contact with the metallic casing wall at a first location and a second unit deployable and adapted to make electrical contact with the metallic casing wall at a second location, wherein the established current loop includes at least a portion of the casing wall between the first and second location; and
wherein the first and second units are configured to be repositionable in relation to one another while the tool is deployed downhole to alter the distance between the first and second locations while the tool is deployed downhole.

27. A system according to claim 26 wherein the one or more surface receivers are induction coil receivers.

28. A system according to claim 26 wherein the one or more surface receivers are electrical field receivers.

29. A system according to claim 26 wherein the first unit comprises a first shuttle and the second unit comprises a second shuttle, wherein the first shuttle and the second shuttle are connected to one another via an extendable wired link.

30. A system according to claim 29 wherein the extendable wired link is configured to carry electrical power.

31. A system according to claim 26 further comprising a processing system programmed and adapted to estimate formation parameters using data from the one or more receivers.

32. A method for making electromagnetic measurements of a subterranean formation comprising:
deploying a first tool in a first metallic cased wellbore, wherein the first downhole tool comprises a first unit and a second unit;
electrically contacting a wall of the casing of first wellbore using the first unit and the second unit, wherein the first unit electrically contacts the metallic casing wall at a first location and a second unit electrically contacts the metallic casing wall at a second location;
establishing a current loop that partially includes a portion of the metallic casing wall of the first wellbore, wherein the current loop induces a field in the subterranean formation, wherein the established current loop includes at least a portion of the casing wall between the first and second location;
deploying one or more surface receivers on an earth surface or on a sea floor;
detecting the field using the one or more surface receivers;
repositioning the first unit in relation to the second unit or the second unit in relation to the first unit, or both, to vary the first location or the second location or both the first location and the second location; and
repeating the detection of the electrical field.

33. A method according to claim 32 wherein the one or more surface receivers are induction coil receivers.

34. A method according to claim 32 wherein the one or more surface receivers are electrode receivers.

35. A method according to claim 32 wherein the first unit comprises a first shuttle and the second unit comprises a second shuttle, wherein the first shuttle and the second shuttle are connected to one another via an extendable wired link.

36. A method according to claim 35 extendable wired link is configured to carry electrical power.

37. A method according to claim 32 further comprising estimating formation parameters based at least in part on data from the one or more receivers.

* * * * *